3,284,262
PROCESS OF APPLYING A POLYESTER COATING TO A REINFORCED, COATED SUBSTRATE

Arthur P. Dowling, Lakewood, Ohio, assignor, by mesne assignments, to Diamond Alkali Company, Cleveland, Ohio, a corporation of Delaware
No Drawing. Filed Mar. 24, 1960, Ser. No. 17,271
9 Claims. (Cl. 156—280)

This invention relates to an improved polyester coating system and to process for applying same to a surface, and more particularly to such system and process wherein a polyester-containing coating material is allowed to set by the action of a peroxide catalyst contained in a film thereunder.

Heretofore peroxide catalysts have been incorporated directly into the polyester coating. The rapidity of curing after the catalyst is added limits the working life or "pot life" of the polyester. To avoid this, it has been proposed to incorporate the peroxide catalyst in a solvent-cut lacquer subcoat which is first applied to the surface to be coated, and then dried by evaporation of the solvent. The uncatalyzed polyester is applied thereover whereby cure of the polyester is effected. Accordingly, the pot life of the polyester resin applied is indefinite. Such technique is disclosed in my copending U.S. patent application 663,600, filed on June 5, 1957, now U.S. Patent No. 3,159,500.

Solvent-cut lacquer subcoatings, e.g., nitrocellulose lacquers, polyvinyl butyral lacquers, ethyl cellulose, polyvinyl acetate, and cellulose acetate-butyrate are satisfactory for such finishes. However, their adherence to the substrate to which they are applied, e.g., wood, hardboard, metal or the like, is frequently non-uniform; weak spots of poor or no adherence are formed. When the polyester topcoat is applied and cured, a sharp rap or a scratch at such weak spot frequently will cause the finish to flake off or to crack.

This invention contemplates the reinforcing of the subcoating with a fibrous membrane whereby spots of weak adhesion of the subcoating to the substrate ("holidays") are, in effect, bridge-over so that non-uniformity of adhesion of the protective coating system is not especially significant, and flaking thereof is reduced. Additionally, unusual decorative effects in pattern and texture can be achieved by the incorporation of a selected fibrous membrane.

Protective coating of unusually good structural strength can be made my the method of this invention, such as those suitable for coating steel tanks and freight car interiors. In food processing, where it is extremely undesirable for flakes of pigmented coating to dislodge and fall into food mixtures, use of this invention is highly desirable, for example, in a tank for plucking fowl wherein a slurry of ice is used to abrade the feathers from the fowl.

The peroxide catalyst-bearing organic subcoating for use in my invention should be cementitious, that is, able to retain the fibrous membrane in place until either the subcoating itself is cured (as by solvent evaporation) or is at least capable of retaining the fibrous membrane in place until the polyester coating material applied thereover sets.

Thus, for example, using a cementitious aqueous emulsion of organic subcoating, i.e., an unfilled or inert-filled subcoating of pasty consistency, the polyester topcoating can be applied after the fibrous membrane has been embedded therein or applied thereover. Such topcoating application can be made before or after such subcoating itself has become ostensibly dry. Advantageously in many instances the cementitious subcoating is formed by the partial evaporation of organic solvent therefrom, thereby creating a pressure-sensitive adhesive layer: the fibrous membrane is then adhesively united to the cementitious residue, and such residue permitted to dry. Thereafter the polyester-containing coating material is applied over the so-reinforced subcoating.

Alternatively, particularly in the case of emulsion subcoatings containing peroxide catalyst, it is possible to apply the fibrous membrane thereto after said membrane has been freshly soaked in uncured polyester-containing material.

The suitable cementitious organic subcoatings for use in the practice of my invention include the tacky residues formed by applying a solvent-cut lacquer to the substrate to be coated and permitting some of the solvent to escape in air. Such lacquers include the aliphatic ethers of cellulose such as cellulose acetate butyrate, esters of cellulose such as cellulose nitrate, ethyl cellulose, polymers of vinyl acetate, or partially hydrolyzed polyvinyl acetate, polyvinyl pyrrolidone and polyvinyl butyral. Catalyzed lacquer subcoatings are described in my copending U.S. patent application Ser. No. 663,600, filed on June 5, 1957, now U.S. Patent No. 3,159,500, and the disclosure of that application is incorporated herein by reference. Useful lacquer solvents include xylene, secondary isopropyl acetate, aqueous or anhydrous denatured alcohol, butyl acetate, methyl isobutyl ketone, amyl acetate, methyl isobutyl carbinol, and light naphthas such as those composed predominantly of mixed hexanes. Usually a mixture of such solvents is used to obtain desired application characteristics, and upwards to about 15% of resin solids are present in the lacquer.

It is critically important that the subcoating used be resistant to the solvent action of the polyester-containing topcoating material in order to suppress any manifest tendency toward wrinkling of the eventual composite protective coating system and/or poor cure of the polyester topcoat. Thus, when emulsion subcoats are used, suitable synthetic resin solids include those polyvinyl synthetic resins having monomer solubility not substantially in excess of about 50%, advantageously about 35%, and preferably about 30%.

Suitable polyvinyl resin emulsion subcoatings are described in my copending U.S. patent application S.N. 17,270, entitled "Improved Polyester Coatings," filed on even date herewith, and the teachings thereof are incorporated expressly by reference in this application. Typically useful are such polyvinyl resins as polyvinyl acetate homopolymers, vinyl chloride-acetate copolymers, vinyl acetate-acrylonitrile coplymers, and polyvinyl acetate-vinyl chloride copolymers. If desired, these emulsions can be filled with inert particulate filler up to about 200% based on the initial volume of the aqueous polyvinyl resin emulsion, because from 20 to 60% resin solids by weight can be incorporated into the emulsion so as to tolerate such high inert solids loading without the subcoating becoming crumbly or otherwise losing structural integrity. When thick subcoats are cast or otherwise applied on the substrate, the fibrous membrane can be embedded therein. Suitable inert fillers include talc, silica sand, mica, asbestos, walnut shell flour, "Microballoons" (minute spheres of C-stage phenolic resin), calcium carbonate, alumina, wood flour, barytes, blanc fixe, inorganic pigments, coated metal particles, and zeolites such as calcium, sodium alumino silicates, especially those having molecular sieve properties.

Because free alkaline impurities such as alkaline earth metal oxides and hydroxides and alkali metal hydroxides, as well as active (e.g., free) transition element oxides such as those of iron, manganese, chromium, vanadium, cobalt and the like tend to accelerate destruction of the peroxide catalyst in the subcoating, it is especially desirable to use inert fillers which have not more than about 1% of such impurities in them in order to get a reasonably long working life of the catalyst in the subcoat. By transition elements I mean those so designated in the Bohr arrangement of chemical elements that can change in valence. Silicates of iron, etc. do not appear especially active. In some instances the incorporation of a chelating agent such as ethylene diamine tetraacetic acid, gluconic acid, tartaric acid, salts thereof, etc. can be helpful for prolonging the catalytic activity of the filled emulsion subcoating.

The preferred fibrous membrane for structural reinforcement is a random surfacing mat or veiling of glass fibers, particularly one approximately 5 mils thick. Use of such membrane in connection with a cementitious subcoating formed by partial evaporation of organic solvent, e.g. lacquer residue, provides a beneficial distribution of stresses that would otherwise lead to adhesion failure. Furthermore, by reinforcing with such glass fiber membrane at the interface between the substrate and the lacquer subcoating as in steel tank bottoms or freight car floors, the tension side of the film is reinforced specially for great durability.

Other suitable fibrous membranes can be unlaid, woven, felted, or adhesively united foraminous sheets of synthetic textile fibers which resist the solvent action of both the subcoating and the polyester-containing topcoating materials for retaining their structural integrity, e.g. acrylic fibers (predominantly polyacrylonitrile), polyamide fibers, and polyester fibers such as polymers of terephthalic acid and ethylene glycol. Low cost cellulosic fibers such as jute or cotton, and common synthetic or natural fibers such as silk, linen, ramie, reconstituted cellulose and the like also can be used if desired, particularly for decorative effects of pattern or texture. Fibers can be pigmented or tinted, preferably with non-bleeding tints, if desired for unusual decorative effect.

Even paper or metal strands, e.g. of aluminum or other metal, can be used for reinforcing or decorative purpose, and these advantageously are resincoated, as with copolymers of vinyl chloride-vinyl acetate, to prevent their causing premature destruction of the catalyst in the cementitious subcoating to which they are applied or embedded. Of course, fiber blends are also contemplated here, e.g. polyamide fibers woven with cotton fibers or glass fibers, etc. When united to a solid substrate, the resulting article comprises an exterior coating material comprising an unsaturated polyester dissolved in a polymerizable monomer over a cementitious subcoating retaining the fibrous reinforcing membrane and bearing a peroxide catalyst capable of curing said exterior coating material.

The free radical catalysts which are suitable for my purposes are generally and preferably peroxides and hydroperoxides including methyl ethyl ketone peroxide, suitable in solution in a high boiling solvent such as dimethyl phthalate, cyclohexanone peroxide, e.g. that ordinarily sold as a concentrated solution in a suitable plasticizer or in a water dispersion, tertiary butyl hydroperoxide, and hydrogen peroxide, available in aqueous or organic solvent solution. Some migration of the peroxide catalyst into the polyester film appears to be necessary; I have found unpromoted benzoyl peroxide to be decidedly inferior to the foregoing ones for my purpose, but when promoted with a dialkyl aniline such as dimethyl aniline or diethyl aniline it is satisfactory. In such instance the emulsion subcoating can contain the peroxide and the polyester carry the promoter.

Suitable polyester resins for practice of this invention contain ethylenic unsaturation and ordinarily are made by condensing one or more unsaturated organic acids with one or more polyhydric alcohols. The polyester resin is dissolved in a cross-linking agent, for example styrene, divinyl benzene, vinyl toluene, a diallyl ester such as diallyl phthalate or the like. The polyester-polymerizable monomer compositions, which are substantially 100% polymerizable, are conventionally stabilized with inhibitors, e.g. phenolic inhibitors, to enable their being stored for extended periods. Certain of them also have incorporated therein a small amount of paraffin wax or the like to prevent air from inhibiting their cure. Others, notably those of the type shown in U.S. Patent 2,852,487, are not inhibited by contact with air. The polyester-containing coating art is well developed; it is shown at length in my copending U.S. patent application S.N. 663,600, which is incorporated expressly by reference herein.

Ordinarily the subcoating of my invention is pigmented white for commercial appeal, although many other tinting and pigmenting tones can be achieved in conventional manner if desired. Generally, also, the polyester topcoating for use in my process is pigmented in such a manner as to mask the red cast imparted to such polyester when it contains a conventional cobalt drier. Pigmenting the polyester topcoating usually involves the incorporation of white pigments such as titanium dioxide into the polyester-containing coating although clear polyester topcoatings can be used satisfactorily in my coating system. The polyester-containing coating also can have a conventional thixotropic agent in its, e.g. fine silica such as "Cab-O-Sil" or the like, the castor oil derivative "Thixcin," etc.

This application is a continuation-in-part of my application S.N. 663,600, filed June 5, 1957, now U.S. Patent No. 3,159,500.

The following examples show ways in which my invention has been practiced, are not to be construed as limiting the invention. All parts are parts by weight, and all percentages are weight percentages unless otherwise expressly indicated. Temperatures given are in degrees Fahrenheit. The gloss enamel used in exemplary preparations was formulated by mixing the following components in the proportions indicated (prior to application over the subcoating there was added to this enamel 0.5 oz. per gallon of cobalt curing promoter which was a 12% solution of cobalt octoate in a mixture of 50% butanol and 50% xylene):

| | | |
|---|---|---|
| Rubber grade styrene | pint | 1 |
| Titania pigment concentrate [1] | lbs | 2.5 |
| Silica gel thixotropic agent | lb | 0.31 |
| Polyester resin [2] | pints | 7 |

[1] Compounded of 12 lbs. of pigmentary rutile titania and 8 pints of the following vehicle: The reaction product of 1.13 mols of propylene glycol, 0.5 mol of maleic anhydride, and 0.5 mol of phthalic anhydride cooked to a maximum temperature of 375° F. in xylene solvent with $CO_2$ stripping, stripped under reduced pressure to 100% solids, then blended with diallyl phthalate monomer, 4 tertiary butyl catechol stabilizer, and acetamidine hydrochloride stabilizer to give a solution containing 50% of the monomer, 0.01% of the catechol stabilizer, and 0.25% of the acetamidine stabilizer. The acetamidine stabilizer was a solution of one part of acetamidine hydrochloride in 4 parts of propylene glycol.

[2] Compounded of the reaction product of 0.88 mol of propylene glycol, 0.5 mol of succinic anhydride, 0.5 mol of maleic anhydride, and 0.25 mol of the mixed mono-, di-, and triallyl ethers of pentaerythritol (analytically averaging the pure diallyl ether of pentaerythritol and having an 11% hydroxyl content, iodine No. of 240, and ash, as sulfate, of 0.18%) which had been cooked in the presence of nitrogen gas and 1% tricresyl phosphate to a maximum temperature of 365° with entrainment of water by xylene solvent, then stripped of solvent with nitrogen gas, cut back with 0.43 part of rubber grade styrene per part of resulting polyester resin, and inhibited (basis polyester resin) with 0.1% p-benzoquinone and 0.25% of a 20% solution of the aforementioned acetamidine hydrochloride in propylene glycol. Viscosity of the resulting mixture was P-R (Gardner-Holdt), acid No. 40±3, polyester content 69% ±1, and weight per gallon 9.14 lbs.

*Example 1*

Polyvinyl acetate homopolymer beads, said polymer having molecular weight estimated at about 600,000–700,000, was dissolved in toluene to give an 8% solution. To the resulting lacquer solution there was added 4 oz. per gallon of a peroxide catalyst, methyl ethyl ketone peroxide, a 60% solution in dimethyl phthalate vehicle.

The catalyzed lacquer was brushed out on a sandblasted metal surface, the solvent allowed to evaporate for five minutes to provide a tacky, pressure-sensitive adhesive film, then a 5 mil thick random glass veiling mat was pressed into the cementitious subcoating. The reinforced subcoating was permitted to dry overnight at room temperature. A film of about 30–40 mils thickness of the gloss polyester enamel was then applied to the fabric reinforced undercoat. The polyester was allowed to cure overnight at 70–75° to a hard tack-free film that could not be scratched by fingernail. It reached maximum hardness in about one week.

The so-coated metal panel was deliberately flexed over a 1/8" mandrel to force cracking of the film. There were no flakes or chips separated from the coating system, and the reinforced coating could not be chipped away from the break. In other words, there was no adhesion failure.

*Example 2*

788.3 parts of an aqueous dispersion of polyvinyl acetate homopolymer solids, 56% non-volatile solids of 1 micron mean particle size in water, the homopolymer having monomer solubility of 26.5% and an estimated molecular weight of its toluene-soluble portion in excess of 100,000, said dispersion having viscosity in the range of 900–1200 centipoises, pH of 4–6, and density of 9.25 lbs. per gallon, were mixed mechanically with 83 parts of pigmentary rutile titania, 21 parts of pulverulent white clay, 24 parts of a 2% aqueous solution of methyl cellulose (viscosity 4,000 centipoises) for thickening, 28 parts of water, 1.04 parts of nonyl phenoxy polyoxyethylene ethanol containing between 9 and 10 mols of ethylene oxide equivalent per mol of alkylated phenol as a surfactant, 1.04 parts of dioctyl sulfosuccinate as a surfactant, and 0.42 part of 2-ethyl hexanol as a defoaming agent. The resulting emulsion had viscosity of about 2150 centipoises at 78°, 9.46 lbs. per gallon density, and 56% non-volatile material.

This emulsion was catalyzed with a peroxide catalyst, methyl ethyl ketone peroxide, a 60% solution in dimethyl phthalate vehicle. The catalyzed emulsion was brushed on to a Douglas fir panel, giving a cementitious subcoating to which there was immediately applied the same kind of random glass veiling mat as used in Example 1. The glass veiling mat was squeegeed into the cementitious film and the film permitted to dry overnight.

A coating of the gloss polyester enamel, about 20 mils thick, was brushed onto the reinforced subcoating and permitted to cure like the polyester film of Example 1. The resulting coating system showed no face checking after repeated cycles of cooling, heating, and treatment with boiling water.

In a similar testing a Douglas fir panel was coated with a reinforced lacquer as in Example 1, then an approximately 20 mil coating of the gloss polyester enamel was applied thereover. The cured system exhibited the same kind of durability on the Douglas fir as did the emulsion subcoating system.

*Example 3*

A section of masonry was painted with the catalyzed lacquer of Example 1, and heavy carpet backing cloth, largely jute, was applied to the resulting tacky film after solvent was flashed in the manner of Example 1. On another section of masonry the catalyzed emulsion of Example 2 was applied and the same kind of carpet backing cloth was pressed thereon. Both reinforced subcoatings were permitted to dry overnight, then each coated with the gloss polyester enamel. Each system cured well, and there resulted on both sections of masonry a durable, oil-resistant, impervious film having decoratively textured effect.

I claim:

1. In a process for coating a surface with a polyester-containing coating material comprising the steps of coating said surface with a solvent-cut lacquer subcoating capable of drying by solvent evaporation and containing a free radical catalyst and a topcoating, capable of being cured by said catalyst in said subcoating, of an unsaturated polyester dissolved in a polymerizable monomer, the improvement which comprises applying to said surface a solvent-cut lacquer subcoating, which is resistant to the solvent action of said polyester topcoating, creating a pressure-sensitive adhesive layer of said subcoating by partially evaporating solvent from said subcoating, thereafter adhesively uniting a permeable fibrous membrane and said polyester topcoating to said subcoating and allowing said subcoating to dry to a non-adhesive residue by solvent evaporation and said polyester topcoating to cure by the action of said catalyst in said subcoat layer.

2. The process of claim 1 wherein said subcoating contains resin solids selected from the group consisting of aliphatic ethers of cellulose, esters of cellulose, polyvinyl butyral, ethyl cellulose, polyvinyl pyrrolidone, partially hydrolyzed polyvinyl acetate, copolymers of vinylchloride-vinyl acetate, copolymers of vinyl acetate-acrylonitrile, and polyvinyl acetate homopolymers.

3. The process of claim 1 wherein said subcoating is an aqueous emulsion containing synthetic resin comprising vinyl acetate units and having monomer insolubility not substantially above about 50%.

4. The process of claim 3 wherein said aqueous emulsion contains about 20–60% by weight of polyvinyl acetate homopolymer solids and has added thereto about 20–200% of an inert filler based on the initial volume of the emulsion.

5. The process of claim 1 wherein said fibrous membrane comprises inorganic fiber.

6. The process of claim 5 wherein said fibrous membrane comprises glass fiber.

7. The process of claim 1 wherein said fibrous membrane comprises cellulosic fiber.

8. The process of claim 1 wherein said fibrous membrane comprises a synthetic textile fiber insoluble in said polyester-containing coating material.

9. The process of claim 1 wherein the fibrous membrane is adhesively united to the subcoat layer and said subcoat is dried to a non-adhesive residue, applying the polyester topcoat layer to said membrane and allowing said topcoat to cure by the action of said catalyst in said subcoat layer.

References Cited by the Examiner

UNITED STATES PATENTS

| | | | |
|---|---|---|---|
| 2,123,152 | 7/1938 | Rivat. | |
| 2,333,513 | 11/1943 | Berberich et al. | |
| 2,359,097 | 9/1944 | Elsey. | |
| 2,437,799 | 3/1948 | Yorke | 154—140 |
| 2,632,753 | 3/1953 | Anderson | 260—45.7 XR |
| 2,817,619 | 12/1957 | Bickel et al. | 117—72 X |
| 2,851,379 | 9/1958 | Staudinger et al. | 117—126 |
| 2,908,602 | 10/1959 | Collardeau et al. | 117—72 X |
| 2,927,867 | 3/1960 | Hings | 117—126 |
| 3,159,500 | 12/1964 | Dowling | 117—72 |

ALEXANDER WYMAN, *Primary Examiner.*

CARL F. KRAFFT, EARL B. BERGERT,
*Examiners.*

P. ISAKOV, R. J. ROCHE, *Assistant Examiners.*